Aug. 1, 1961 F. J. DELANEY 2,994,790

DATA PHASE-CODING SYSTEM USING PARALLEL PULSE
INJECTION IN BINARY DIVIDER CHAIN

Filed Feb. 19, 1958 4 Sheets-Sheet 1

INVENTOR.
FRANK J. DELANEY
BY Moody and Goldman
ATTORNEYS

ELECTRODE OF A QUARTZ OSCILLATOR

Filed May 26, 1958 2 Sheets-Sheet 2

INVENTORS
TOSHIO SHINADA
MICHITAKA YAMAGUCHI
BY [signature]
ATTORNEY

Aug. 1, 1961 F. J. DELANEY 2,994,790

DATA PHASE-CODING SYSTEM USING PARALLEL PULSE INJECTION IN BINARY DIVIDER CHAIN

Filed Feb. 19, 1958 4 Sheets-Sheet 3

INVENTOR.

FRANK J. DELANEY

BY Moody and Goldman

ATTORNEYS

INVENTOR.
FRANK J. DELANEY
BY Moody and Goldman
ATTORNEYS 2,994,790

DATA PHASE-CODING SYSTEM USING PARALLEL PULSE INJECTION IN BINARY DIVIDER CHAIN

Frank J. Delaney, North Hollywood, Calif., assignor to Collins Radio Company, Cedar Rapids, Iowa, a corporation of Iowa Filed Feb. 19, 1958, Ser. No. 716,206
13 Claims. (Cl. 307—88.5)

This invention relates generally to means for translating pulsed binary information into incremental phase variations of a carrier or subcarrier frequency. Such incremental phase translation represents a type of modulation that can be used to transmit any type of information capable of digital representation and, for example, may be used to transmit a teletypewriter signal or sampled bits of a continuously varying signal.

This invention utilizes a basic system of transmisison taught in Patent No. 2,676,245 to Melvin L. Doelz, titled "Polar Communication System," and issued April 20, 1954. Briefly, the Doelz system utilizes predetermined phase changes between adjacent time-increments (pulses) of a transmitted frequency to recognize a mark or space of a binary code. Thus, the system detects a mark or space by a phase comparison of two adjacent pulses, wherein each pulse acts as a phase reference for its immediately following pulse. Therefore, the Doelz system does not require any absolute phase reference and hence is not appreciably susceptible to unpredictable phase shifts caused by unknown delays in the propagation of a radio signal.

Furthermore, such system is particularly adaptable for the transmission of two independent information channels on a single frequency (tone). This is done by providing one of four phase conditions for each new pulse, with respect to the prior pulse.

However, more than two binary channels can be transmitted simultaneously on a single frequency by providing a plurality of possible phase conditions between adjacent pulses, wherein the plurality is equal to twice the number of channels. Generally, increasing the number of channels in this manner decreases the bandwidth-per-channel but also decreases the signal-to-noise ratio of each channel.

One means for transmitting information according to the Doelz communication system is described and claimed in patent application Serial No. 502,045 of Melvin L. Doelz and Dean F. Babcock, titled "High Speed Transmission of Printed Messages," filed April 18, 1955, now Patent No. 2,905,812, issued September 22, 1959. It recirculates a tone between two magnetostrictive resonator-integrators with two data-signal controlled phase shifters connected respectively between them. The phase-modulated output is taken from gates connected to the respective resonators.

Another means for transmitting information according to the Doelz communication system is described and claimed in patent application Serial No. 626,493 of George H. Barry, titled "Phase-Pulse Generator," filed December 5, 1956, now Patent No. 2,915,633, issued December 1, 1959, which utilizes a plurality of frequency dividers connected to a fixed frequency source, with the output of the last divider providing the output frequency of the generator. It obtains incremental phase shifts of its output frequency in response to input data mark and space pulses by either (1) blocking at its frequency-divider input a computed number of cycles received from the fixed source, or (2) by-passing a computed number of received cycles around one or more of the frequency dividers. To enable control over the number of cycles to be blocked or by-passed, an intermediate change from sine-wave to pulsed form is provided for the fixed frequency source. Also, electronic counters and a matrix system are required with the Barry generator to determine when cycles should be blocked or by-passed and to compute the number of cycles that should be so treated in order to respond to a given data input.

The present invention provides a uniquely modified generator of output incremental phase-shifts in response to digital input data, and does not use the blocking or by-passing arrangement or the counter techinque of the last-cited patent application.

The following objects recite many advantages of the present invention over prior means for generating a like output signal. Hence, it is an object of the present invention to provide a phase-pulse modulation generator:

Which has an output phase accuracy that can initially be made as accurate as required without later adjustment of any kind;

That has its output phase unaffected by variations in temperature and supply voltage;

Which does not have its output phase affected by amplitude changes caused by instabilities common to electronic equipment;

Which has an output amplitude that is independent of the phase-shift generated;

That does not require precision components beyond those required to maintain the frequency stability of a fixed frequency source;

Which requires only a single timing input for simultaneous dual-channel data input operation, wherein the timing input is common to all data pulse sources;

That permits high data-input impedances, thus allowing data-input signals to have low power;

That does not require magnetostrictive components;

Which is smaller, lighter and consumes less power than any prior type of phase-pulse generator; and, Which, without alteration, is adaptable to either single or dual-channel data operation, while enabling a theoretical three decibel improvement for single-channel detection over dual-channel detection.

The invention uses a stable-frequency source, such as a magnetostrictive tone oscillator. A pulse-forming circuit receives the source frequency and generates from it first and second pulsed outputs, each having a repetition-rate equal to the source frequency but having pulses that are time-interleaved with each other. A pulse-repetition-rate divider network receives the first pulsed output and frequency divides it. The divider network comprises a plurality of binary dividers connected in tandem. The number of such dividers determines the smallest increment of output phase-shift for the system, which is given by the following expression:

$$\text{Smallest incremental phase-shift} = \frac{360°}{2^N} \quad (1)$$

where N is the number of tandem-connected dividers in the network. Hence, where the smallest incremental phase-shift required is 45°, three binary dividers are used. Each incremental phase-shift provided at the output of the system is some integer multiple of its smallest incremental phase-shift.

The invention provides parallel-pulse injection to the inputs of the respective binary dividers in the network. That is, the injected pulses are in parallel with the normal divider-input pulses originating from the pulse-forming circuit.

Input-data controls which of the respective dividers should receive a parallel-pulse injection. The parallel data-pulse injection is timed to occur very shortly after a new set of input-data pulses are provided. Initially, a sequence of events leading to a parallel-pulse injection is initiated by a timing pulse that is timed with the beginning of each data pulse. The parallel injection waits until the counter network goes through a "zero" count and is triggered by the first pulse (triggering pulse) thereafter occurring from the second output of the pulse-forming circuit.

Not all of the respective dividers receive a parallel-injected pulse with each new set of data-input pulses. Rather, coded permutations of the dividers are correlated with combinations of data input pulses to determine the sequence of dividers which shall respectively receive a parallel-injected pulse. The coding of the parallel injected pulses is done by a plurality of "and" circuits that are connected between the data inputs and the inputs to the respective binary dividers. The coding "and" circuits are enabled by the data inputs according to the coded permutations; and only the enabled "and" circuits provide parallel-injected pulses upon the reception of a triggering pulse.

The "zero" count of the binary divider network is obtained when the respective divider outputs all reach the same state, which is designated as the "zero" state. For example, each binary divider circuit is capable of providing two output voltage states that may be described as "0" and "1." Thus, where three binary dividers are used in a network, all simultaneously have an "0" state at a given output point once every eighth input pulse to the divider network.

Further objects, features and advantages of this invention will become apparent to a person skilled in the art upon further study of the specification and accompanying drawings, in which:

FIGURE 1 illustrates a form of the invention;

FIGURE 2 gives a code relationship between the input data and the output phase of the system;

FIGURES 3(A) through (H), (J), and (K) illustrate waveforms used in explaining the operation of the invention;

Figures 1, 2:
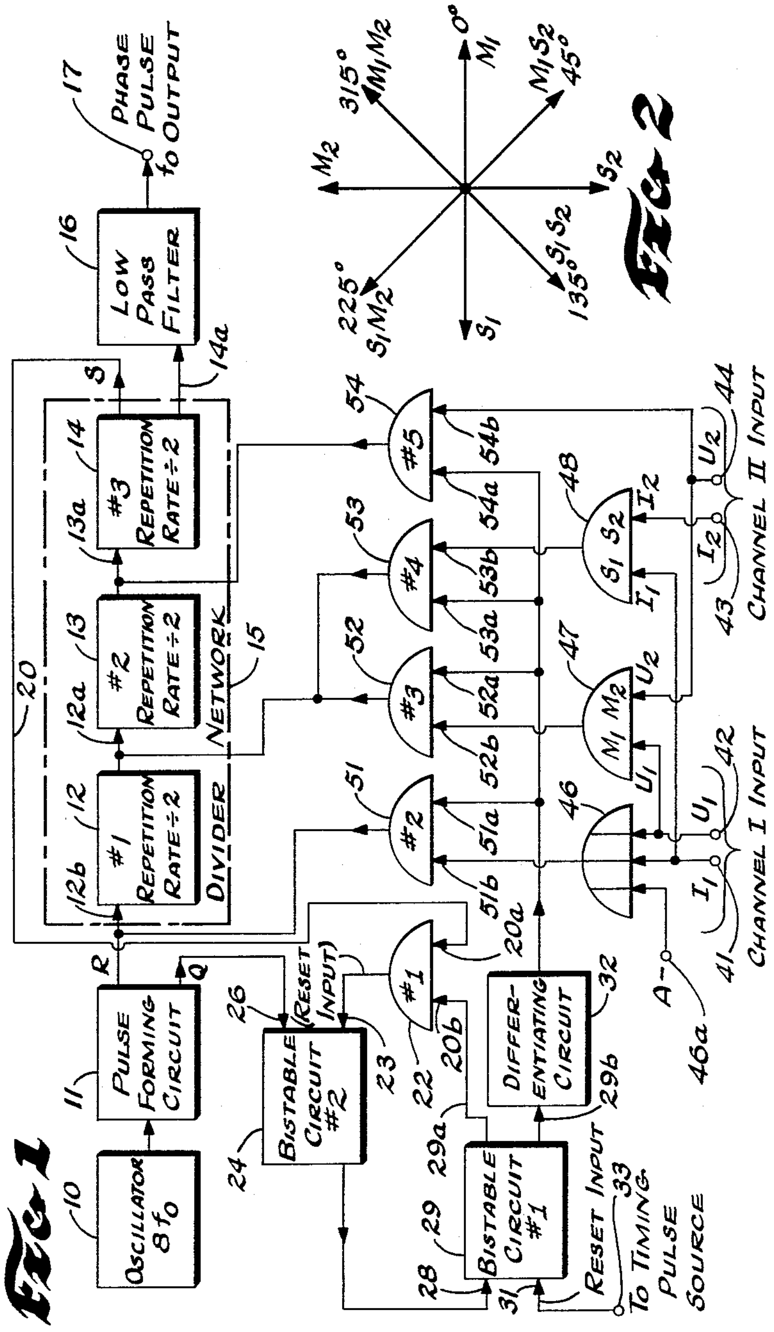

Now referring to the invention in more detail, FIGURE 1 illustrates a form of the invention wherein the component blocks individually represent well-known types of circuits. They include an oscillator 10 which provides a frequency $8f_0$, where $f_0$ is the frequency of the output of the system provided at a terminal 17.

A pulse-forming circuit 11 receives the output of oscillator 10 and generates two pulsed outputs, R and Q, each having repetition rate $8f_0$. However, the pulses of output Q are time-interleaved with respect to the pulses of output R. This can be seen by the time relationship of the pulses illustrated in FIGURES 3(E) and 3(G). The time-interleaved outputs are obtained, for example, by generating two opposite-phased oscillator signals and having two blocking oscillators respectively triggered by the positive-going parts of the signals.

Three binary repetition-rate dividers 12, 13, and 14 are connected in tandem to comprise a divider network 15, which receives output R and repetition-rate divides it by eight. A low-pass filter 16 receives the divider network output and selectively passes its fundamental-frequency component to output terminal 17. Due to the repetition-rate division by eight, the output frequency of the sine wave at terminal 17 is $f_0$, which is one-eighth of the frequency of oscillator 10.

A second pulse output S is obtained from last repetition-rate divider 14 and, of course, has one-eighth of the repetition rate of the pulsed output from circuit 11. Thus, output S has opposite phase (or opposite instantaneous polarity) from output 14a, that provides the output of the system. At the instant output S begins a pulse, each of the respective divider outputs 12a, 13a, and 14a are at "0" state, and therefore output S identifies the state of the component dividers. Output S is connected by a lead 20 to an input 20a of a first "and" circuit 22. Nevertheless, "and" circuit 22 does not provide any output when it receives an S-pulse at input 20a, unless an enabling input is simultaneously applied at its other input terminal 20b. However, no enabling input is received at terminal 20b most of time; but it is periodically applied as explained below.

A first bistable circuit 29 has an output 29a connected to input 20b of "and" circuit 22. Circuit 29 provides an enabling input to terminal 20b only when reset by a timing pulse provided to a terminal 33, which is connected to a timing pulse source (not shown). A timing pulse is received at input 31 upon the initiation of each set of data pulses, which are received at data input terminals 41, 42, and 43, 44. Hence, "and" circuit input 20b is enabled at the initiation of each timing pulse; but "and" circuit 22 does not provide any output until the first instant that the respective divider outputs all reach their "zero" state, wherein output S activates "and" circuit 22 to provide an output to a reset input 23 of a second bistable circuit 24. Accordingly, bistable circuit 24 is reset by the first S-pulse occurring after a timing pulse; and this reset instant occurs as the counters in network 15 each reach a "zero" state.

The other input 26 of bistable circuit 24 is connected to pulsed output Q of pulse-forming circuit 11. After being reset, the very first Q-pulse received by input 26 triggers bistable circuit 24, which then provides an output pulse to input 28 to trigger bistable circuit 29. The triggering of circuit 29 provides an "activating" pulse through a differentiating circuit 32 to respective inputs of a set of "and" circuits 51, 52, 53 and 54. The activating pulse enables the parallel-pulse injection to the divider network, previously mentioned, but which is described in detail below.

Furthermore, the triggering pulse received at input 28 reverses the output state of bistable circuit 29, thus reversing its output 29a to provide a disabling input to "and" circuit 22. Thus, later pulses from output S, caused by repetitious "zeros," cannot cause any output from "and" circuit 22. As a result, bistable circuits 29 and 24 cannot be reset until respectively at and after the next timing pulse is received. Hence, Q-pulses received at input 26 during non-reset periods have no effect on bistable circuit 24.

The channel-I input data provided at either terminal 41 or 42 comprises marks ($M_1$) and spaces ($S_1$). Channel-I input data is provided in inverted form (opposite phase or polarity) at terminals 41 and 42. Thus, the data at terminal 42 is uninverted ($U_1$), while the data at terminal 41 is inverted ($I_1$). Since the data is binary in form, marks and spaces are respectively represented by two different voltage levels at each terminal. For example, at terminal 41, a "space" is signified by a voltage level "*b*" and a "mark" by a voltage level "*a*"; and oppositely at terminal 42, a space is represented by level "*a*" and a mark by level "*b*." In a similar manner, channel-II input data is provided with opposite polarity at terminals 43 and 44, where at terminal 43 level "*b*" represents a space and level "*a*" a mark; and reversedly at terminal 44, level "*b*" represents a mark and level "*a*" a space. Hence, uninverted data $U_2$ is received at terminal 44 and inverted data is received at terminal 43. However, each terminal 43 or 44 receives the same information in the forms, $M_2$ (mark) and $S_2$ (space).

FIGURE 2 illustrates a vectorial code that correlates binary input data-pulse combinations with different incremental digital output phase shifts between adjacent phase-pulses provided from terminal 17. The phase-pulses are synchronous time-portions of the output wave. Each phase-pulse is phase shifted at its introduction to provide it with a given digital phase shift relative to its immediately preceding phase pulse according to the code given in FIGURE 2. After its introductory phase shift, which is a transient condition, a fixed phase remains for the remainder of its synchronous duration. Thus in FIGURE 2, the relative incremental phase between any adjacent phase-pulses is represented by the angle between vector 0°, representing the phase of the prior phase-pulse, and one of the vectors 45°, 135°, 225°, and 315°, representing the four possible phases of the following phase-pulse relative to its preceding phase-pulse. It must be realized that the adjacent prior pulse having 0° phase need not have a fixed absolute phase since the modulation is coded entirely in the relative phase between each two adjacent phase-pulses. Thus, each phase, except the first of a sequence, is the second pulse of one pair and the first pulse of the next pair.

In the present embodiment of the invention, the reference 0° vector phase can have any of eight different phases relative to the phase of oscillator 10.

In FIGURE 2, it is seen that the relative phases 45°, 135°, 225°, and 315° respectively represent the data combinations $M_1S_2$, $S_1S_2$, or $M_1M_2$, which are all of the dual combinations of data. Thus, a sequential choice of phases at terminal 17 can provide the simultaneous but independent channels of binary information being simultaneously presented at the channel-I and channel-II input terminals.

It is noted that each of the adjacent phases for output pulses given in FIGURE 2 is a multiple of 45° and that each can be represented by sums taken from the values 45°, 90° and 180°. These discrete summations are used by this invention and are shown by the following table:

*Table*

| Phase-Pulse | Phase-shift, degrees | Summation, degrees |
|---|---|---|
| $M_1S_2$ | 45 | 45 |
| $S_1S_2$ | 135 | 45+90 |
| $S_1M_2$ | 225 | 45+180 |
| $M_1M_2$ | 315 | 45+90+180 |

The phase-shifts at terminal 17 are related by this summation table to the order of parallel-pulse injection to dividers 12, 13 and 14.

It is noted in FIGURE 1 that as long as pulses-R are provided to the divider network, without more, a continuous sine-wave output is provided from output terminal 17 at frequency $f_0$. As long as nothing disturbs this normal pulse sequence, no phase-shift occurs at terminal 17. However, if between the transition flips caused to any divider by consecutive input pulses-R, a pulse from an external source is parallel injected at the divider input, an incremental phase-shift occurs in the output wave at terminal 17. Consequently, a single pulse parallel-injected at the input to divider 12 causes the output tone to be advanced in phase by 45°. This is because each input pulse to counter 12 represents one-eighth of a cycle at output terminal 17.

Furthermore, a parallel injected pulse at the input to divider 13 causes a phase-shift of 90° to occur in the tone output at terminal 17 because each pulse received at the input of divider 13 represents one-fourth of a cycle of output at terminal 17.

Still further, a parallel-injected pulse at the input to divider 14 causes a phase shift at terminal 17 of 180°, because it takes two pulses at the input of divider 14 to provide a cycle of output at terminal 17.

It is therefore apparent that digital phase-shifts of 45°, 90°, and 180° at terminal 17 can be respectively obtained by parallel injecting additional pulses at the inputs of any of dividers 12, 13 and 14. Furthermore, by selectively and simultaneously parallel-injecting pulses to various combinations of dividers, 12, 13, and 14, their respective 45°, 90° and 180° phase-shifts can be selectively and simultaneously added to provide any of the phase shifts, 45°, 135°, 225° or 315°.

It is realized that if the parallel injection were to occur during a regular transition of the divider, the parallel injection would be ineffective. The regular divider transitions are time coincident with pulses R. That is why the parallel injections are timed with interleaved pulses Q, which are not time coincident with the regular transition of any divider, assuming small delay time between the dividers compared to the repetition period of pulses R.

Thus, it is seen that a single parallel-injected pulse at the input divider 12 provides the 45° phase-shift necessary to obtain the $M_1S_2$ output phase given in FIGURE 2. Furthermore, simultaneous parallel-injection of pulses to dividers 12 and 13 provides a combined phase-shift of 45° plus 90° (which is 135°) to provide the relative pulse phase $S_1S_2$ given in FIGURE 2. In a like manner, simultaneous parallel-injection of pulses at the inputs to dividers 12 and 14 obtains an output phase-shift of 45° plus 180° (which is 225°) to obtain the pulse phase $S_1M_2$ given in FIGURE 2. Moreover, simultaneous parallel injection of a pulse to each of the inputs of all dividers 12, 13, and 14 obtains an output phase shift of 45° plus 90° plus 180° (which is 315°) to provide the phase of pulse $M_1M_2$ in FIGURE 2.

A matrix comprising "and" circuits 47, 48, 51, 52, 53, and 54 codes simultaneous channel-I and channel-II input data to enable parallel-pulse injection to the divider network. "And" circuits 51–54 are enabled in coded order by simultaneous channel-I and channel-II data pulses; so that a later activating pulse from differentiating circuit 32 to circuits 51–54 causes a parallel-injection only from those circuits which were enabled by the data "and" circuits 51–54 each have one input **51*a*, 52*a*, 53*a*, or 54*a* connected to the output of differentiating circuit 32. As explained above, a single activating pulse from circuit 32** occurs after each timing pulse, which is synchronous with the received data pulses.

Hence, each "and" circuit 51–54 has an enabling input that receives data-derived coded information. These inputs are **51*b*, 52*b*, 53*b*, and 54*b***, respectively.

It is noted from the table given above that each dual-channel output phase-pulse requires at least a 45° phase-shift as a portion of its phase-shift summation. Accordingly, "and" circuit 51 is continuously enabled so that it can provide a parallel-injected pulse to divider 12 with each activating pulse following each synchronous timing pulse. Actually, all that would be needed if the system were to operate only as a dual-channel system, is a source of enabling direct-current potential connected to input **51*b* to continuously enable "and" circuit 51. However, because the system of FIGURE 1 is also organized to operate as a single-channel system, an "or" circuit 46 is provided. A continuous enabling potential is, in effect, provided through "or" circuit 46 to terminal 51*b* from the two-channel-I input terminals 41 and 42. "Or" circuit 46** passes the higher level "*b*" provided at either input terminal. Since the inputs at terminals 41 and 42 are inverted, one is always at a high level "*b*" when the other is at a low level "*a*." Hence, during continuous dual-channel operation, a "*b*" level output is continuously provided from "or" circuit 46 to continuously enable "and" circuit 51.

Terminal **46*a*** is connected to a disabling voltage A—, which is used to obtain single-channel operation, but it is not necessary for dual-channel operation. Single-channel operation is explained below in detail.

The "and" circuits in this specification provide an output only when both inputs are at "*b*" level.

"And" circuit 47 has one input connected to terminal 42 to receive the uninverted channel-I input, $U_1$, and its other input terminal is connected to terminal 44 to receive channel-II uninverted input, $U_2$. Consequently, "and" circuit 47 only provides an output when marks ($M_1M_2$) are simultaneously being provided from both data channels, since both uninverted inputs are at "*b*" levels only when providing mark data.

In a like manner, "and" circuit 48 has one input connected to terminal 41 to receive the channel-I inverted input $I_1$, while the other input terminal of circuit 48 is connected to terminal 43 to receive the channel-II inverted input $I_2$. Hence, "and" circuit 48 provides an output only when the channels are both providing space data $S_1S_2$, since the inverted inputs are both at levels "*b*" only while receiving space-data inputs.

The output of "and" circuit 47 is connected to an enabling input **52*b* of "and" circuit input 52. Likewise, the output of "and" circuit 48 is connected to the enabling input 53*b* of "and" circuit input 53. Also, terminal 44 is directly connected to the enabling input 54*b* of "and" circuit 54**.

Furthermore, as explained above, "and" circuit 51 is continually enabled by the output of "or" circuit 46 during dual-channel operation. Accordingly, circuit 51 causes a component 45° phase-shift in the output frequency after each set of data pulses by its continual parallel-pulse injections to the input of divider 12. As can be seen from the above table, this provides output phase-pulse $M_1S_2$, if no other parallel pulses are injected to the other dividers 13 and 14. However, if any other phase-pulses are required, the 45° phase-shift is also a required component part of them.

The outputs of "and" circuits 52 and 53 are both connected to the input of divider 13. Thus, an output from either of these "and" circuits causes a component 90° phase-shift. As seen in FIGURE 2 and as given in the above table, 90° phase-shifts are components of the phase pulses, $S_1S_2$ and $M_1M_2$. Accordingly, the output of "and" circuit 48 enables the injection of a parallel-pulse to divider 13 upon the reception of $S_1S_2$ information; and the output of "and" circuit 47 enables the injection of a parallel pulse to divider 13 upon the reception of $M_1M_2$ data.

In the case of the reception of $S_1S_2$ data, only "and" circuits 51 and 53 are enabled to cause a parallel-injection only to dividers 12 and 13 to provide the 135° phase-shift (45°+90°) required. "And" circuit 54 is not then enabled because it can only be enabled by $M_2$ data.

With $M_1M_2$ input-data pulses, all of the dividers receive a parallel injected pulse to provide a phase shift of (45°+90°+180°), which is 315° for the output phase-pulse. And with $S_1M_2$ input-data pulses, neither of "and" circuits 47 or 48 can provide an output. Thus, neither of "and" circuits 52 or 53 is enabled, divider 13 cannot therefore receive a parallel-pulse injection, and there cannot be a component 90° phase shift. However, "and" circuits 54 and 51 are enabled to provide a total output phase shift of 225°, which is (45°+180°).

The operation of the system can be more clearly understood with the waveform-timing example given by FIGURES 3(A)–(K). FIGURES 3(A) and 3(B) respectively illustrate uninverted channels I and II input-data pulses as they appear at terminals 42 and 44. It will, of course, be realized that the signals appearing on terminals 41 and 43, respectively, will be reversed in polarity (inverted) from those illustrated. FIGURE 3(C) represents the output frequency $8f_0$ of oscillator 10. Its fixed frequency can be any value which provides many cycles per phase-pulse period. FIGURE 3(D) illustrates the time-position of timing pulses received at terminal 33. The leading edge of the timing pulse is coincident with the leading edges of the new data pulses $M_1$ and $M_2$ in FIGURES 3(A) and 3(B). The vertical line 60 represents a single instant of time throughout all of the FIGURES 3(A)–(K). It is presumed in this illustration that there is no phase-locked situation between the oscillator 10 wave in FIGURE 3(C) and the occurrence of the timing pulses. Due to practical difficulties, such phase-locked synchronism is not ordinarily used, although it does provide some degree of improvement for the system. Pulse-forming circuit 11 provides at its output R the sequence of pulses represented by FIGURE 3(E). Pulses R are generated by the upward portions of the oscillator cycles as they pass through their alternating-current axis 61. FIGURE 3(G) illustrates the other output Q of pulse-forming circuit 11, which generates a pulse from the downward-going portion of each cycle of oscillator 10, as the alternating axis 61 is crossed. Many types of conventional means are known for generating pulses in this manner. Consequently, the pulses Q occur approximately midway between pulses R. It is not important to this invention that pulses Q occur precisely midway between pulses R, as long as pulses Q and R are not time coincident.

As explained above, every time the divider network receives eight pulses R, its component dividers simultaneously pass through a zero state. FIGURE 3(F) illustrates pulses S (differentiated), which indicate when the divider system reaches a simultaneous zero state. Due to the lack of synchronism between the timing pulses and oscillator 10, the occurrence of the leading edge of an S pulse (differentiated) is arbitrarily between one and eight cycles at the $8f_0$ frequency after the occurrence of a timing pulse. In FIGURE 3(F), it is arbitrarily assumed that the first S pulse 71 occurs slightly more than three cycles of $8f_0$ after instant 60. The lack of synchronism between the timing pulses and oscillator 10 cannot cause difficulty in the operation of bistable circuit 29, because the receipt of a pulse at input 28 cannot occur until after reset by a timing pulse, due to the intermediate action of bistable circuit 24, which awaits the following S and Q pulses.

At instant 60, the introduction of data pulses $M_1$ and $M_2$ at the channel inputs enables "and" circuits 52 and 54; and circuit 51 is automatically enabled, as explained above. Thereafter, enabled circuits 51, 52, and 54 are each prepared to yield simultaneously a parallel-injected pulse to the inputs of their respective dividers 12, 13 and 14 upon receiving an activating pulse from differentiating circuit 32, which must await a "zero" count S-pulse from the divider network. As soon as the first "zero" count occurs to provide S-pulse 71 in FIGURE 3(F) to "and" circuit 22, it provides an output pulse that resets bistable circuit 24. When circuit 24 is reset, it is susceptible to triggering by the first Q pulse thereafter received, which is Q-pulse 72 in FIGURE 3(G). Pulse 72 triggers bistable circuit 24, which hence triggers bistable circuit 29 and causes an activating pulse from differentiating circuit 32 to "and" circuits 51, 52, and 54; wherein they provide parallel-injected pulses to counters 12, 13, and 14, which cause a 315° phase-shift at output terminal 17. This phase shift is equivalent to providing seven quick pulses at the input terminal to the divider network, because each input pulse to the network has a 45° effect on the output phase-shift.

The reason the system awaits a "zero" condition for each divider for parallel-injection is because when in "zero" states the dividers do not provide any output pulses when triggered. They provide their respective output pulses when being triggered from a "one" state. Hence, the triggering by parallel-injected pulses cannot cause an output pulse from any divider to interfere with (due to time-coincidence) the parallel-injected pulse to the next divider and possibly cause it to falsely operate.

Accordingly, the combined data inputs $M_1$ and $M_2$ cause injection that is equivalent to a "normalized" injection of "seven pulses" at the input to the divider-network. It must be realized that the term "normalized pulses" represents a fictitious set of pulses since they do not in fact exist, but they are useful in understanding the basic operation of the system. FIGURE 3(H) illustrates the "normalized pulses" equivalent to $M_1M_2$ data pulses; and FIGURE 3(J) illustrates the "normalized pulses" superimposed on the actual input pulses R to the divider network to provide the "total effective input" to the divider network.

Due to the nature of a pulse divider network that divides by eight, a single pulse is provided at its output for each eight pulses provided at the divider-network input regardless of whether such pulses are actual or "normalized." The fundamental frequency of such total effective output pulsed wave provides the output wave at terminal 17. Solid-line wave 74 in FIGURE 3(K) illustrates the output wave at terminal 17 as it is phase-shifted by the parallel-pulse injection represented by the "seven normalized pulses." A transient portion of the wave occurs at the time of the parallel-pulse injection. This is apparent from wave 74. The new phase of the wave after the transient represents the new $M_1M_2$ phase-pulse. The phase of the new phase-pulse in FIGURE 3(K) is shown with respect to the prior phase-pulse by extending the wave of the prior phase-pulse in a sinusoidal manner by means of dotted-line 76. It can be seen that the new phase-pulse is 315° leading with respect to the prior phase-pulse.

A similar situation occurs with other input data combinations. Thus, one "normalized pulse" is equivalent to $M_1S_2$ data, three "normalized pulses" are equivalent to $S_1S_2$ data, and five "normalized pulses" are equivalent to $S_1M_2$ data. The given output phase-shifts result, as shown in FIGURE 2.

Figure 5:
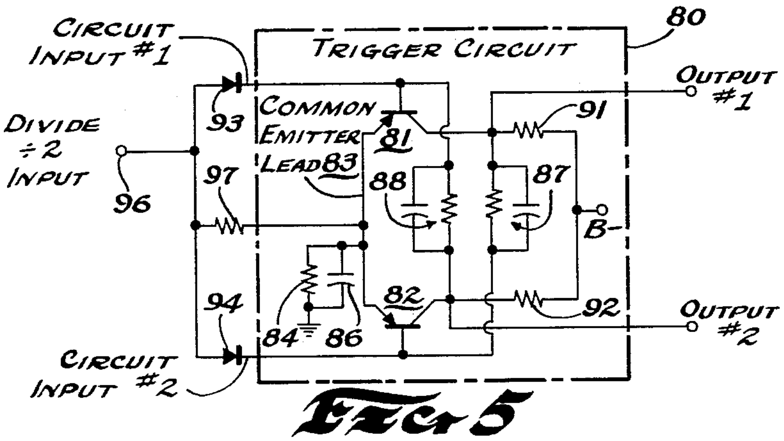
FIGURE 5 is a known type of trigger circuit that is arranged as a binary divider, which can be used as a component in the invention.
Figure 6:
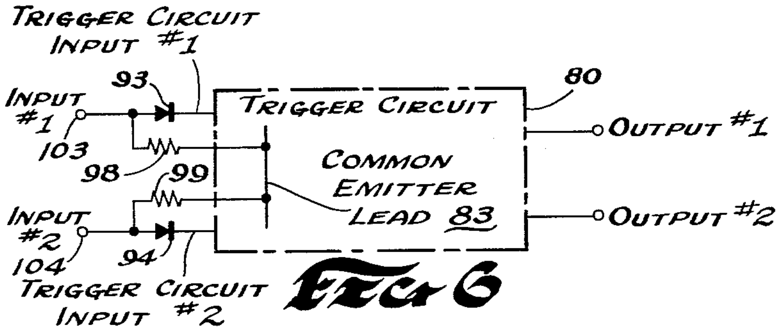
Figure 7:
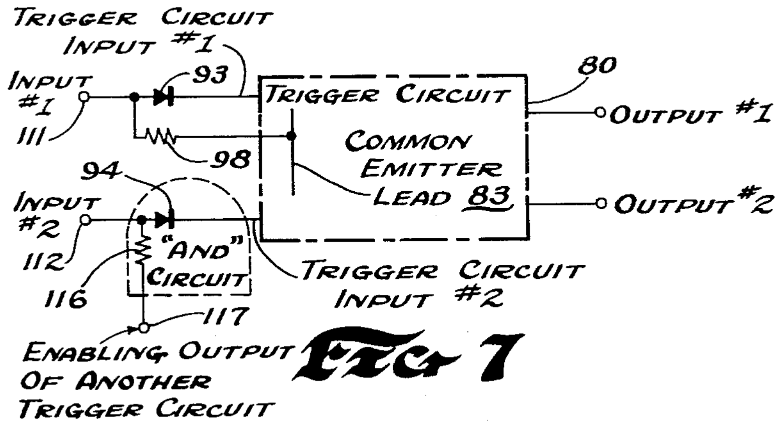

Many conventional trigger circuits can be used in the system of FIGURE 1. One well-known type found particularly suitable is shown in FIGURE 5, which uses two transistors 81 and 82 having their emitters connected by a common lead 83, which is connected to ground through a resistor 84 and a capacitor 86. A parallel RC circuit 87 connects the collector of transistor 81 to the base of transistor 82. Another parallel RC circuit 88 connects the collector of transistor 82 to the base of transistor 81. Resistors 91 and 92 respectively connect the collectors of the transistors to a B— power source. First and second outputs are obtained respectively from the collectors of transistors 81 and 82.

The basic trigger circuit thus described is identified by outline 80 in FIGURE 5. The basic circuit can accomplish various functions by the manner of connecting its inputs. In FIGURE 5, the inputs are connected so that the trigger circuit acts as a binary pulse-repetition-rate divider. This is done by providing a pair of diodes 93 and 94 having their cathodes respectively connected to the bases of transistors 81 and 82 and having their anodes connected to a terminal 96, which receives pulses to be repetition-rate-divided by two. A resistor 97 connects between the anodes of the diodes and common-emitter lead 83 to establish a bias on the diodes. Common-emitter lead 83 is maintained at a substantially constant-voltage level regardless of the output state of the trigger circuit and can be used as a reference voltage source. The triggering operation of this circuit is so well-known that it will not be explained here. Circuits of the type illustrated in FIGURE 5 can provide the binary dividers 12, 13, and 14 in FIGURE 1, where only one output is used.

Figure 6:
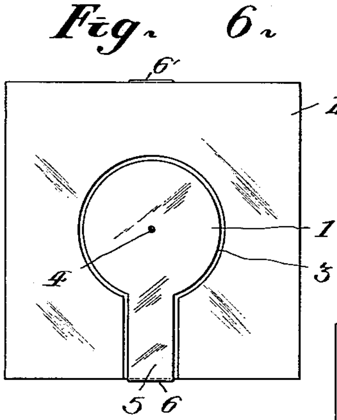
FIGURE 6 illustrates another input arrangement for the trigger circuit of FIGURE 5 so that it can provide a memory function.

FIGURE 6 illustrates another form of input connection for basic trigger circuit 80, which causes it to remember an input state. The circuit of FIGURE 6 is sometimes called a "toggle" circuit. It has two input terminals 103 and 104 that connect respectively to the anodes of diodes 93 and 94. Their anodes are respectively connected to common-emitter lead 83 through resistors 98 and 99 to maintain the proper bias on the diodes. The respective outputs of the trigger circuit in FIGURE 6 remember which of the two inputs has received the last positive pulse. Thus, output #1 is at "*b*" level, and output #2 at "*a*" level, after a positive pulse is applied to input terminal 104. Oppositely, output #2 is at "*b*" level and output

#1 at "*a*" level, after a positive pulse is applied to input terminal 103. Once triggered to a given state, the input receiving the triggering positive pulse is no longer susceptible to triggering by another pulse until after the opposite input is "reset" by a positive pulse.

Figure 7:
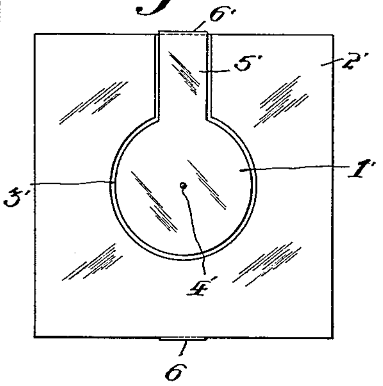
FIGURE 7 shows still another input arrangement for the trigger circuit of FIGURE 5 to enable another operational function.
Figure 8:
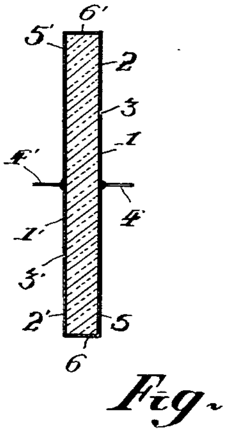
Figure 9:
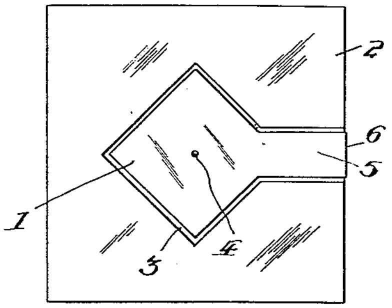

The input arrangement of FIGURE 7 for trigger circuit 80 utilizes diode 94 in an "and" circuit arrangement. It includes a pair of input terminals 111 and 112, which are connected to the anodes of diodes 93 and 94. The bias on diode 93 is established by resistor 98 connected between its anode and common-emitter lead 83. Thus, a positive pulse received at terminal 111 is capable of altering the state of the trigger circuit, provided that it was previously in the opposite state. However, the anode of diode 94 is connected through a resistor 116 to an enabling input terminal 117. The voltage at terminal 117 is capable of either enabling or disabling the passage of pulses to the second trigger circuit input. When the voltage at terminal 117 enables, the bias on diode 94 is near enough to conduction level that pulses from terminal 112 pass through diode 94 to trigger the circuit, provided that the circuit was previously reset by a positive pulse at terminal 111. When the voltage at terminal 117 is at a disabling level, diode 94 is biased so far below cut-off that a pulse at terminal 112 cannot pass through diode 94 to effect the trigger circuit.

With respect to FIGURE 1, the circuit of FIGURE 6 can be used as first bistable circuit 29, and the circuit of FIGURE 7 can be used as second bistable circuit 24 and "and" circuit 22.

Figure 4:
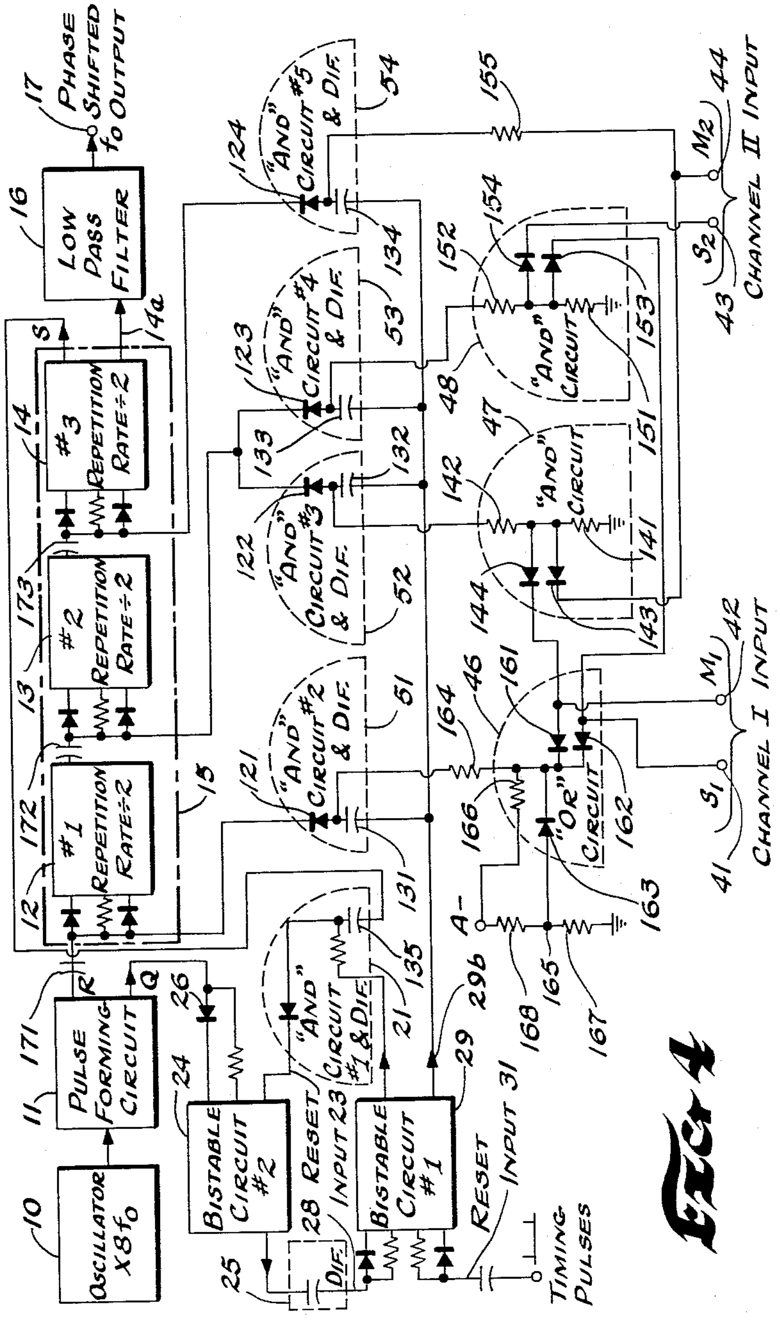
FIGURE 4 shows a more detailed form of the system given in FIGURE 1.

FIGURE 4 illustrates a more detailed version of the circuit shown in FIGURE 1. It illustrates a particular construction for the "and" and "or" circuits in the system. Furthermore, it shows how the various circuits illustrated in FIGURES 5, 6 and 7 can be connected together to comprise the invention. Each "and" circuit 51, 52, 53, and 54 includes a diode 121, 122, 123, and 124, respectively. The diodes have their cathodes respectively connected to the inputs of repetition-rate dividers 12, 13 and 14. However, in addition to the diodes, a capacitor 131, 132, 133, and 134 is provided which respectively connects the output **29*b* of bistable circuit 29 to the anodes of diodes. Capacitors 131–134 have a dual purpose: first, they differentiate the output of bistable circuit 29 and accordingly replace the function of differentiating circuit 32** in FIGURE 1; and second, they act as blocking capacitors to permit control of the bias levels for the diodes.

"And" circuit 47 has a pair of resistors 141 and 142 connected between ground and the anode of diode 122; and a pair of diodes 143 and 144 have their anodes connected between resistors 141 and 142. The cathode of diode 144 is connected to data-input terminal 42, and the cathode of diode 143 is connected to data-input terminal 44.

Similarly, "and" circuit 48 includes a pair of resistors 151 and 152 connected in series between ground and the anode of diode 123. A pair of diodes 153 and 154 have their anodes connected between resistors 151 and 152. The cathode of diode 153 is connected to data-input terminal 41, and the cathode of diode 154 is connected to data-input terminal 43. A resistor 155 also connects data-input terminal 44 to the anode of diode 124 of "and" circuit 54.

"Or" circuit 46 is comprised of diodes 161, 162, and 163, wherein a resistor 164 connects the anode of diode 121 of "and" circuit 151 to the cathodes of diodes 161, 162 and 163. The anodes of diodes 161 and 162, respectively, connect to channel-I input terminals 42 and 41. The anode of diode 163 is connected to a tap-point 165 on a voltage-divider consisting of resistors 167 and 168 connected between ground and source A—.

Also in FIGURE 4, the input to each pulse-repetition-rate divider is differentiated, before being received, by a respective capacitor 171, 172, and 173, and resistance in series with them. Also, a differentiating circuit 25 comprising a capacitor (and series resistance not shown) is connected serially with the output of bistable circuit 24 to differentiate its input to bistable circuit 29. Also, another differentiating capacitor 135 is provided with "and" circuit 21 to differentiate its S-pulse input.

The dual-channel operation of the circuit in FIGURE 4 is the same as explained in connection with the circuit of FIGURE 1, since it is a more detailed version of the same circuit.

In some cases only a single input-data channel is available. Under such circumstances, it is desirable to provide an optimum phase-shift of 180° between mark and space information. This can be done by phase-shifting the output between either 0° and 180° or between 90° and 270° for adjacent output phase-pulses. Such 180° minimum separation for single-channel operation obtains a three decibel gain in signal-to-noise ratio over the minimum 45° separation for dual-channel operation.

The 90° and 270° operation is obtained by connecting the available single channel to terminals 43 and 44, and by leaving terminals 41 and 42 disconnected. With no *"b"* level inputs being provided to "or" circuit 46 through diodes 161 or 162 from terminals 42 or 41, the disabling A— level through the output of the "or" circuit provides a large nonconduction bias on diode 121 to disable "and" circuit 51. With circuit 51 disabled, the continuous 45° phase shifts are no longer obtained by it in response to activating pulses.

However, circuits 47 and 48 then do not provide "and" operation; but they provide a "through-connection" for the data received at terminals 43 and 44. This is done by making resistance 166 large compared to resistances 141 or 151. Although diodes 161, 144 and 162, 153 are closed by the A— source under these conditions, much of the A— voltage is dropped across resistor 166; and the voltage across resistors 141 and 151 is held only slightly below ground potential. In this manner the voltage across resistors 141 and 151 is controlled by data-pulse levels applied to terminals 43 and 44. As a result, the input data-pulse levels directly control the output levels from "and" circuits 47 and 48 under single-channel operation.

Accordingly, when a data mark (M) is applied, "and" circuits 122 and 124 are enabled; and the next activating pulse causes parallel-injected pulses to dividers 13 and 14, providing an output phase-shift of (90°+180°)=270°. On the other hand, when a data space is applied, only "and" circuit 52 is enabled; and the next activating pulse causes a parallel-injected pulse only to divider 13 to provide an output phase-shift of 90°.

Consequently, a single channel of data at the channel-II input terminals causes 180° output phase shifts between 90° and 270°, which provides a three decibel improvement over dual-channel operation.

Although this invention has been described with respect to particular embodiments thereof, it is not to be so limited as changes and modifications may be made therein which are within the full intended scope of the invention as defined by the appended claims.

I claim:

1. A phase-pulse generator for phase shifting an output by an incremental amount comprising, a frequency source, pulse-forming means connected to said frequency source and providing a pulsed output, a plurality of pulse-repetition-rate dividers connected in tandem to the pulsed output of said pulse-forming means, a plurality of parallel-pulse-injection circuits connected respectively to the inputs of at least some of said dividers, a second pulsed output of said pulse-forming means, and means for activating said parallel-pulse-injection means between selected output pulses from said pulse-forming circuit with said second pulsed output.

2. A phase-pulse generator as defined in claim 1 in which said dividers are binary, means for sensing when all of said dividers are at zero state, and in which said means for activating said parallel-pulse-injection means between consecutive pulses from said pulse forming circuit occurs when said dividers are at said zero state.

3. A phase-pulse generator for phase-shifting an output by incremental amounts comprising a frequency source, pulse-forming means connected to said frequency source and providing at least a pair of pulsed outputs, with the pulses of said outputs being time interleaved with respect to each other, a plurality of pulse-repetition-rate dividers connected in tandem to one of said pair of pulsed outputs, a plurality of parallel-pulse-injection means, with at least one connected to the input of each of said dividers for selectively providing pulses to the divider inputs, a timing-pulse source for determining the time instant for phase-shifting said output, and means for injecting the pulses from said parallel-pulse-injection means in response to a pulse from the other pulsed output of said pulse-forming-circuit following a pulse from said timing-pulse source.

4. A phase-pulse generator as defined in claim 3 in which each of said pulse-repetition-rate dividers is a binary divider, means for sensing when all of said dividers are at zero state, and means for triggering said parallel-pulse-injection means in response to the first pulse from the other output of said pulse-forming circuit following the sensed zero state of said dividers and a pulse from said timing pulse source.

5. In a phase-pulse generator comprising, a frequency source, pulse-forming means connected to said frequency source and providing a pair of time interleaved pulsed outputs, a plurality of pulse-repetition-rate dividers connected in tandem to one output of said pulse-forming means, a filter connected to a last of said dividers and passing a given frequency spectrum from the output of said dividers, a pair of bistable circuits each having a first input and an output and a reset input, the first input of one bistable circuit being connected to the other output of the pulse-forming circuit, the output of said one bistable circuit being connected to the first input of said other bistable circuit, a timing-pulse source connected to the reset input of said other bistable circuit, an "and" circuit having an output and at least a pair of inputs, with its output being connected to the reset input of said one bistable circuit, one input of said "and" circuit being connected to the output of said other bistable circuit, and the output of said dividers being connected to the other input of said "and" circuit, and means for injecting a pulse at the input of at least one of said dividers to cause a timed phase-shift to an output from said filter, whereby the output of said another bistable circuit indicates the first zero state of said dividers following a pulse from said timing-pulse source.

6. A phase-pulse generator for phase shifting an output by incremental amounts including the generator defined in claim 5 in which said means for injecting a pulse comprises, a plurality of parallel-pulse-injection means respectively connected to the inputs of at least some of said dividers, data means for selectively enabling said parallel-pulse-injection means, means connecting said parallel-pulse-injection means to the output of said another bistable circuit, with the output of said another bistable circuit actuating said pulse-injection means to inject pulses to their connected dividers.

7. A phase-pulse generator for phase shifting an output by incremental amounts comprising, a frequency source, pulse-forming means connected to said frequency source and providing a pulsed output, a plurality of pulse-repetition-rate dividers connected in tandem to the output of said pulse-forming means, means connected to the output of the last of said dividers for providing a zero-state pulse when all of said dividers are at zero state, a plurality of "and" circuits having their outputs respectively connected to the inputs of said dividers and having at least first and second inputs, data means connected at least to the second input of each of said computing circuits for enabling the "and" circuits in correlation to received data, a source of timing pulses; activating-pulse-generating means being triggered by the successive reception of one of said timing pulses, zero-state pulses; and said activating-pulse-generating means having its output connected to the first input of each of said "and" circuits.

8. A phase-pulse generator for phase-shifting an output frequency by incremental amounts comprising, a frequency source, pulse-forming means connected to said frequency source and providing a pair of time-interleaved pulsed outputs, a plurality of pulse-repetition-rate binary dividers connected in tandem to one of said pulsed outputs, a filter passing one of the harmonic frequencies in the output of the last divider, differentiating means connected to the output of the last of said dividers for providing a zero-state pulse when all of said dividers are at zero state, a plurality of "and" circuits having their outputs connected to inputs of said dividers and each having at least first and second inputs, data means connected at least to the second input of each of said "and" circuits for enabling them in correlation with received data, a source of timing pulses; activating-pulse-generating means being triggered by the successive reception of one of said timing pulses, zero-state pulses, and pulses from said other pulsed output; said activating-pulse-generating means having its output connected to the first input of each of said "and" circuits.

9. A phase-pulse generator as defined in claim 8 in which said plurality of binary dividers comprises three dividers, said filter being a low-pass filter, and the remaining portions of the system comprising, first and second channels of binary information, a pair of additional "and" circuits, each of said channels providing inverted and uninverted data, with one of said additional "and" circuits receiving the inverted data of said channels, and the other additional "and" circuit receiving the uninverted data of said channels, a pair of said first-mentioned "and" circuits having their outputs connected to the input of the second divider, the outputs of said additional "and" circuits being connected to respective inputs of said pair of "and" circuits, and means continually enabling the "and" circuit connected to the first divider.

10. A phase-pulse generator for phase shifting an output frequency in response to first and second data inputs, comprising a source of frequency eight times the output frequency, a pulse-forming circuit connected to the output of said frequency source and providing first and second pulsed outputs that are time interleaved; first, second, and third binary repetition-rate dividers connected in tandem to the first output of said pulse-forming circuit; a low-pass filter connected to the ouput of said third divider and providing the output frequency of said generator; first, second, third, fourth, and fifth "and" circuits, each having at least first and second inputs and an output; the output of said second, third, and fifth "and" circuits being respectively connected to the inputs of said first, second, and third dividers; and the output of said fourth "and" circuit also being connected to the input of said second divider; first and second bistable circuits, each having a pair of inputs and a pair of outputs, a timing-pulse source also being connected to one input of said first bistable circuit; differentiating means connecting one output of said first bistable circuit to the first input of each of said second, third, fourth, and fifth "and" circuits; the other output of said first bistable circuit being connected to one input of said first "and" circuit, means connecting the output of said third divider to the other input of said first "and" circuit, the inputs to said second bistable circuit being connected respectively to the output of said first "and" circuit and the second output of said pulse-forming circuit, means connecting the output of said second bistable circuit to the other input of said first bistable circuit; and means coupling said first and second data inputs to the second input of said second, third, fourth, and fifth "and" circuits.

11. A generator as defined in claim 10 also including means connecting an enabling source to the second input of said second "and" circuit.

12. A system as defined in claim 11 further comprising a first pair of terminals respectively receiving inverted and uninverted data from said first channel, a second pair of input terminals respectively receiving inverted and uninverted data from said second channel, a sixth "and" circuit having a pair of inputs connected to the terminals receiving uninverted data, the output of said sixth "and" circuit being connected to the other input of said third "and" circuit, a seventh "and" circuit having a pair of inputs respectively connected to the terminals receiving inverted data, and the terminal receiving uninverted data from said second channel being connected to the second input of said fifth "and" circuit.

13. A generator as defined in claim 12 also including an "or" circuit having three inputs, with a disabling source connected to one input, and its remaining inputs respectively connected to one of said pairs of terminals.

References Cited in the file of this patent

UNITED STATES PATENTS

| | | |
|---|---|---|
| 2,521,789 | Grosdoff | Sept. 12, 1950 |
| 2,770,725 | Lentz | Nov. 13, 1956 |

OTHER REFERENCES

Arithmetic Operations in Digital Computers, by Richards, copyrighted 1955, page 106.

Electronics, October 1956, pp. 220–23 "Phase Generator for Tropospheric Research" by R. W. Hubbard et al.